(12) United States Patent
Harijan et al.

(10) Patent No.: US 11,720,612 B2
(45) Date of Patent: Aug. 8, 2023

(54) SYSTEM AND METHOD TO AVOID SENDING A MESSAGE TO THE UNINTENDED RECIPIENT

(71) Applicant: Rovi Guides, Inc., San Jose, CA (US)

(72) Inventors: Kuppappa Harijan, Bengaluru (IN); Madhusudhan Srinivasan, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 237 days.

(21) Appl. No.: 16/407,347

(22) Filed: May 9, 2019

(65) Prior Publication Data
US 2020/0356587 A1    Nov. 12, 2020

(51) Int. Cl.
| G06F 16/33 | (2019.01) |
| G06F 16/31 | (2019.01) |
| G06F 16/335 | (2019.01) |
| H04L 51/046 | (2022.01) |
| H04L 51/224 | (2022.01) |

(52) U.S. Cl.
CPC ........ *G06F 16/3344* (2019.01); *G06F 16/322* (2019.01); *G06F 16/335* (2019.01); *H04L 51/046* (2013.01); *H04L 51/224* (2022.05)

(58) Field of Classification Search
CPC .. G06F 16/3344; G06F 16/322; G06F 16/335; H04L 51/046; H04L 51/24; H04L 51/14; H04L 51/16
USPC ........................................................ 707/725
See application file for complete search history.

(56) References Cited

U.S. PATENT DOCUMENTS

| 7,774,421 | B2 | 8/2010 | Dubovsky et al. |
| 8,275,839 | B2 * | 9/2012 | Auerbach ............ G06Q 10/107 709/206 |
| 9,262,751 | B1 * | 2/2016 | Wheeler .............. G06Q 10/107 |
| 10,346,411 | B1 * | 7/2019 | Deselaers ......... G06F 16/24578 |
| 10,796,338 | B2 * | 10/2020 | Cohn .................. G06F 16/2379 |
| 2008/0250114 | A1 * | 10/2008 | Dubovsky ............ G06Q 10/107 709/206 |
| 2010/0318620 | A1 * | 12/2010 | Bansal .................... H04L 51/16 709/206 |
| 2012/0124483 | A1 * | 5/2012 | Zuckerberg ............. H04L 51/08 715/752 |

(Continued)

OTHER PUBLICATIONS

International Search Report and Written Opinion in PCT/US2020/032096 dated Aug. 18, 2020.

*Primary Examiner* — Hicham Skhoun
(74) *Attorney, Agent, or Firm* — Haley Guiliano LLP

(57) ABSTRACT

Methods and systems are described for preventing a message from being sent to an unintended recipient. A first context data structure is generated for a first conversation, a second context data structure is created for a second conversation, and then a message input is received as intended for the first conversation. The message is correlated with each of the first context data structures and the second context data structure to determine a relevance score corresponding to each of the first and second conversation. The relevance scores are compared and if the relevance score for the first conversation is greater than the relevance score for the second conversation, the message is sent; however, if the relevance score for the second conversation is greater than the relevance score for the first conversation, the message is not sent and the message is prevented from being sent to, for example, an unintended recipient.

16 Claims, 8 Drawing Sheets

(56) References Cited

U.S. PATENT DOCUMENTS

| | | | |
|---|---|---|---|
| 2012/0215861 A1* | 8/2012 | Smith | G06Q 10/107 709/206 |
| 2013/0097526 A1* | 4/2013 | Stovicek | G06Q 10/107 715/752 |
| 2015/0058428 A1* | 2/2015 | Caskey | H04L 51/02 709/206 |
| 2016/0080291 A1* | 3/2016 | Caliendo, Jr. | H04L 51/28 709/206 |
| 2016/0112359 A1* | 4/2016 | Allen | H04L 51/14 709/206 |
| 2016/0156581 A1* | 6/2016 | Li | H04L 51/043 709/206 |
| 2016/0173421 A1* | 6/2016 | Alshinnawi | H04L 51/16 709/206 |
| 2016/0366088 A1* | 12/2016 | Abou Mahmoud | H04L 67/306 |
| 2017/0206545 A1* | 7/2017 | Gupta | G06Q 30/0226 |
| 2018/0152403 A1* | 5/2018 | Charignon | H04L 51/043 |
| 2019/0020606 A1* | 1/2019 | Vasudeva | G06F 40/30 |
| 2019/0166121 A1* | 5/2019 | Colby | H04L 51/38 |
| 2019/0361934 A1* | 11/2019 | Rogynskyy | G06Q 10/06312 |
| 2020/0106630 A1* | 4/2020 | Bourassa | H04L 12/1818 |
| 2020/0151620 A1* | 5/2020 | Chao | H04L 51/12 |
| 2020/0226217 A1* | 7/2020 | Anders | H04L 51/216 |

\* cited by examiner

Data Structure
Conversation Data Structure

| Date/Time | Message | From | Keywords | Topic |
|---|---|---|---|---|
| 2019-3-5 6:35 PM | Are You Coming Over to Watch the Game Tonight? | User | Coming, Game, Watch | Game, Sports, TV |
| 2019-3-5 6:47 PM | No. I have Work to do. | John W. | Work, Job | Work |
| 2019-3-5 6:48 PM | Ok. NP | User | No Problem, Ok | Ok |
| 2019-3-5 7:02 PM | How was Your Vacation? | John W. | Vacation, was | Vacation |

310 — table; 312 Date/Time; 314 Message; 316 From; 318 Keywords; 320 Topic; 322, 324, 326, 328 rows.

Message Data Structure

| Date/Time | Message | To | Keywords |
|---|---|---|---|
| 2019-3-5 7:03 PM | Great! Lisa and I Enjoyed the Trip a lot. I Proposed and She Said Yes! | Landscaping | Trip, Propose, Yes, Lisa |

330 — table; 332 Date/Time; 334 Message; 336 To; 338 Keywords; 340 row.

FIG. 3A

Conversation Data Structure

| Date/Time | Message | From | Keywords | Topic | Type |
|---|---|---|---|---|---|
| 2019-3-5 6:35 PM | Are You Coming Over to Watch the Game Tonight? | User | Coming, Game, Watch | Game, Sports, TV | Question |
| 2019-3-5 6:47 PM | No. I have Work to do. | John W. | Work, Job | Work | Reply |
| 2019-3-5 6:48 PM | Ok. NP | User | No Problem, Ok | Ok | Other |
| 2019-3-5 7:02 PM | How was Your Vacation? | John W. | Vacation, was | Vacation | Question |

350 — table; 352 Date/Time; 354 Message; 356 From; 358 Keywords; 360 Topic; 361 Type; 362, 364, 366, 368 rows.

Message Data Structure

| Date/Time | Message | To | Keywords | Type |
|---|---|---|---|---|
| 2019-3-5 7:03 PM | Great! Lisa and I Enjoyed the Trip a lot. I Proposed and She Said Yes! | Landscaping | Trip, Propose, Yes, Lisa | Reply |

370 — table; 372 Date/Time; 374 Message; 376 To; 378 Keywords; 379 Type; 380 row.

FIG. 3B

SYSTEM AND METHOD TO AVOID SENDING A MESSAGE TO THE UNINTENDED RECIPIENT

BACKGROUND

The present disclosure relates to systems for sending and receiving messages, and more particularly to systems and related processes for preventing a message from being sent to an unintended recipient and for correlating multiple conversations with a message to be sent.

SUMMARY

Modern digital messaging and communications services facilitate sending and receiving of messages to and from users all over the world. Users communicate with one another via text-based digital messages as a virtual extension of real-world human interaction. Not only do users send a message to transmit a statement; users are able to exchange ideas with one another. For instance, users often use messaging systems such as email, instant message, social media comments or text messages to ask questions, reply, offer advice, disagree, and make plans for the future. The sophistication and speed of modern digital messaging services allow real-time conversations and discussions between users to occur both instantly and over an extended period of time, often with brief messages intended to prompt a response from the recipient and advance a discussion. Additionally, the modern devices used to transmit digital messages—e.g., servers, computers, telephones, smartphones, tablets, e-readers, voice-controlled devices, televisions, digital content systems and video game consoles, and other internet-enabled appliances—utilize advanced hardware with increased memory and faster processors to allow multiple instant conversations even while multi-tasking in many applications. Sometimes a user's fingers may move faster than the user's eyes. With more messages, more conversations, and more multi-tasking come more opportunities for a user to reply in the wrong conversation and potentially send a message to an unintended recipient.

A conversation may be a message exchange between two or more recipients. A conversation may also be a message exchange discussing a single conversation topic or multiple conversation topics, where topics change quickly. A conversation could be a single message, for instance, in the case of a user or recipient changing topics and/or initiating a new conversation. A user of a messaging application may be involved in multiple conversations with multiple recipients, but also may be involved in multiple conversations with a single recipient. Messaging services and messaging applications often list message exchanges in reverse chronological order, as most recent messages are often in most need of actions such as reading and replying. A conversation may last long periods of time, e.g., weeks or months, especially if a user forgets to reply for an extended period of time. A conversation may also be defined by message time data. For instance, a conversation concerning an invitation or proposing a time for an event may become obsolete after the event occurs. There exists a need to track conversations and store conversation data to better ensure a message is not sent to the wrong conversation.

One problematic, embarrassing situation may occur while a mobile device user is browsing the web or playing a video game: a notification appears on part of the screen displaying a question or remark in a message from an acquaintance, and the user switches to the messaging application and types a reply in the wrong conversation. Replying to a message may be as simple as clicking or touching the notification; however, if the notification disappears or the user completes another task prior to replying the device may require the user to separately open the appropriate messaging application to reply. If the user does not verify that the conversation displayed after switching to the appropriate messaging app is the pertinent conversation, the user runs the risk of replying to an unintended recipient. A private message reply intended to describe a user's vacation to a close friend may be inadvertently sent to a landscaping service employee asking to schedule inspection of an irrigation system.

Messaging systems and applications such as iMessage, Android Messages, Facebook, Instagram, Snapchat, WhatsApp, WeChat, QQ, Viber, Line, Telegram, Skype, Google Hangouts, Kik, as well as other SMS, messaging, and email applications, may not always display the latest message automatically upon application switch, especially if the user had other running conversations open previously. Manually switching to the appropriate messaging application to begin typing a response without reading the displayed conversation is a common occurrence, especially when the user is eager to reply or focusing on responding to the content of the received message. Additionally, hitting "send" after quickly typing a reply before reviewing the message or the conversation is a regular habit for many users.

To complicate matters, sometimes the experience is inconsistent across messaging services, and even within a messaging application, as switching to the appropriate app to reply may bring up the desired conversation automatically but bring up another conversation another time. While an application may attempt to predict which of the conversations a user wishes to add to, only the user knows the specific conversation to which he or she intends to reply. When there are multiple conversations, there exists a need for the system or application to check the conversation and the message to better ensure that the message is a reply in the correct conversation, so as not to send the message to an unintended recipient.

One approach may include reviewing a reply to determine if it is appropriate for a particular recipient by analyzing prior messages to or from the recipient to identify keywords that should (or should not) appear in a message to that recipient. Such an approach over-limits the user's ability to reply and may prevent the user from changing conversation topics and introducing new ideas in the message exchange. This approach and other approaches may look solely at a conversation and the reply to determine relevancy without comparing relevancy of a message to other conversations and, for instance, taking into account whether other conversations may be more relevant to the reply. Other approaches may generally look at a reply to see if it has things in common with a conversation before allowing the message to be sent, but these approaches ignore whether there are other conversations occurring simultaneously. Additionally, timing of the conversations and the reply are not considered in these other approaches, as there is no reason to incorporate timing when an approach focuses on only a single conversation.

The present invention provides a system and processes to prevent a message from being sent to an unintended recipient by determining if the reply is a better fit in another conversation. One embodiment of the present invention may generate a context data structure for each conversation based on content of the conversation and correlates the reply with each context data structure to determine a respective relevance score. If the relevance score for the conversation where the reply was typed is highest, the message is sent; otherwise the message is prevented from being sent and a warning is displayed.

Moreover, if a new conversation is being initiated via reply to a prior conversation, the messaging system will not prevent the reply from being sent merely because it does not seem to fit in the first conversation. For instance, the system and processes may compare each relevance score to a threshold, where even if a conversation may have a higher relevance score, the reply may not be relevant to any prior conversation, and it is sent to the intended recipient(s).

The present invention may also correlate the time of each conversation with the time of a reply message to identify if replying to one conversation or another conversation would be timelier. Conversation time data may also be relevant to a long outstanding reply or could indicate a new topic or the beginning of a new conversation.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3A depicts an illustrative table for a conversation data structure and message data structure, in accordance with some embodiments of the disclosure;

FIG. 3B depicts an illustrative table for a conversation data structure and message data structure, in accordance with some embodiments of the disclosure;

DETAILED DESCRIPTION

Figure 1:
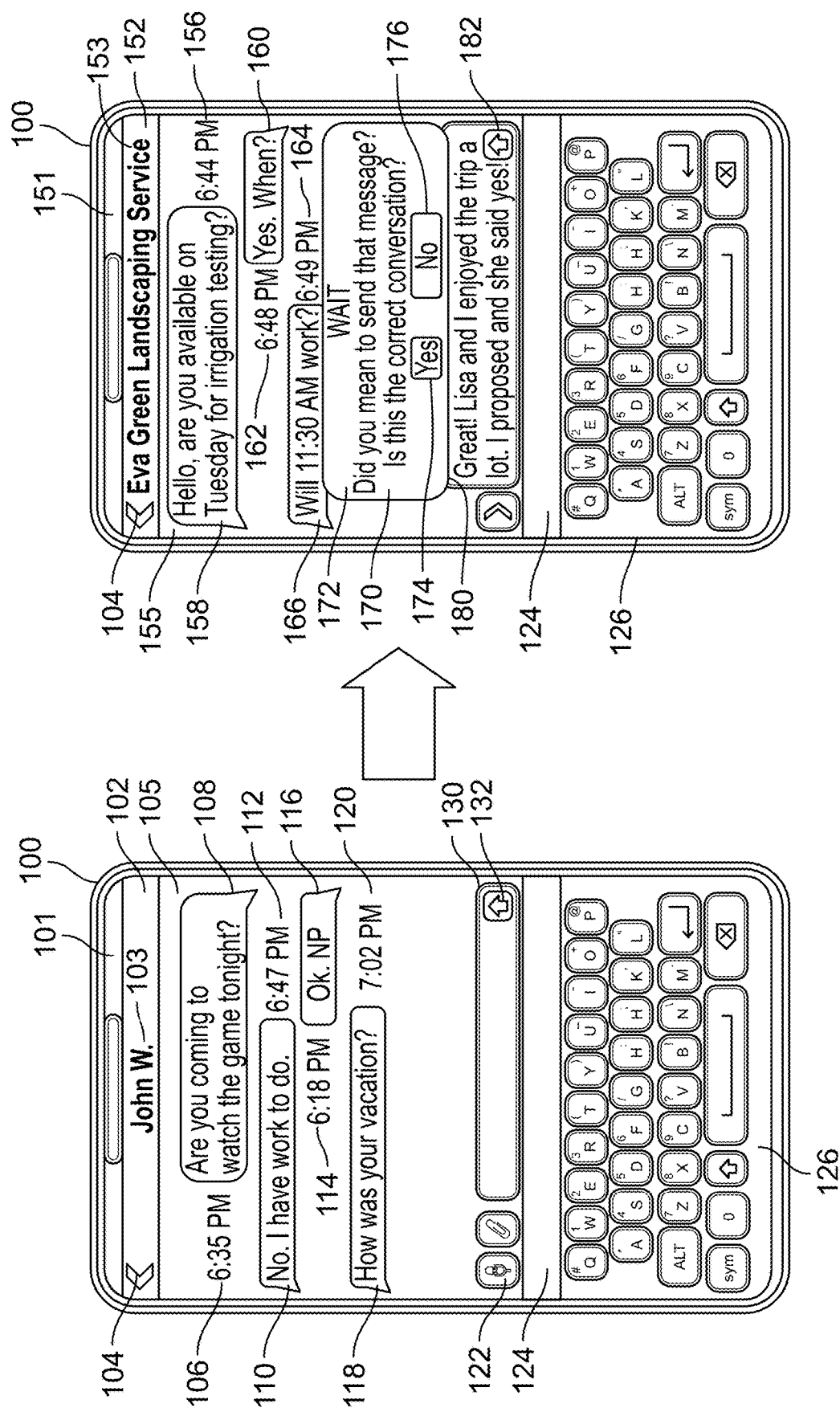
FIG. 1 depicts an illustrative scenario and user interface for preventing a message from being sent to an unintended recipient, in accordance with some embodiments of the disclosure.

FIG. 1 depicts an illustrative scenario and user interface for preventing a message from being sent to an unintended recipient, in accordance with some embodiments of the disclosure.

Figure 7:
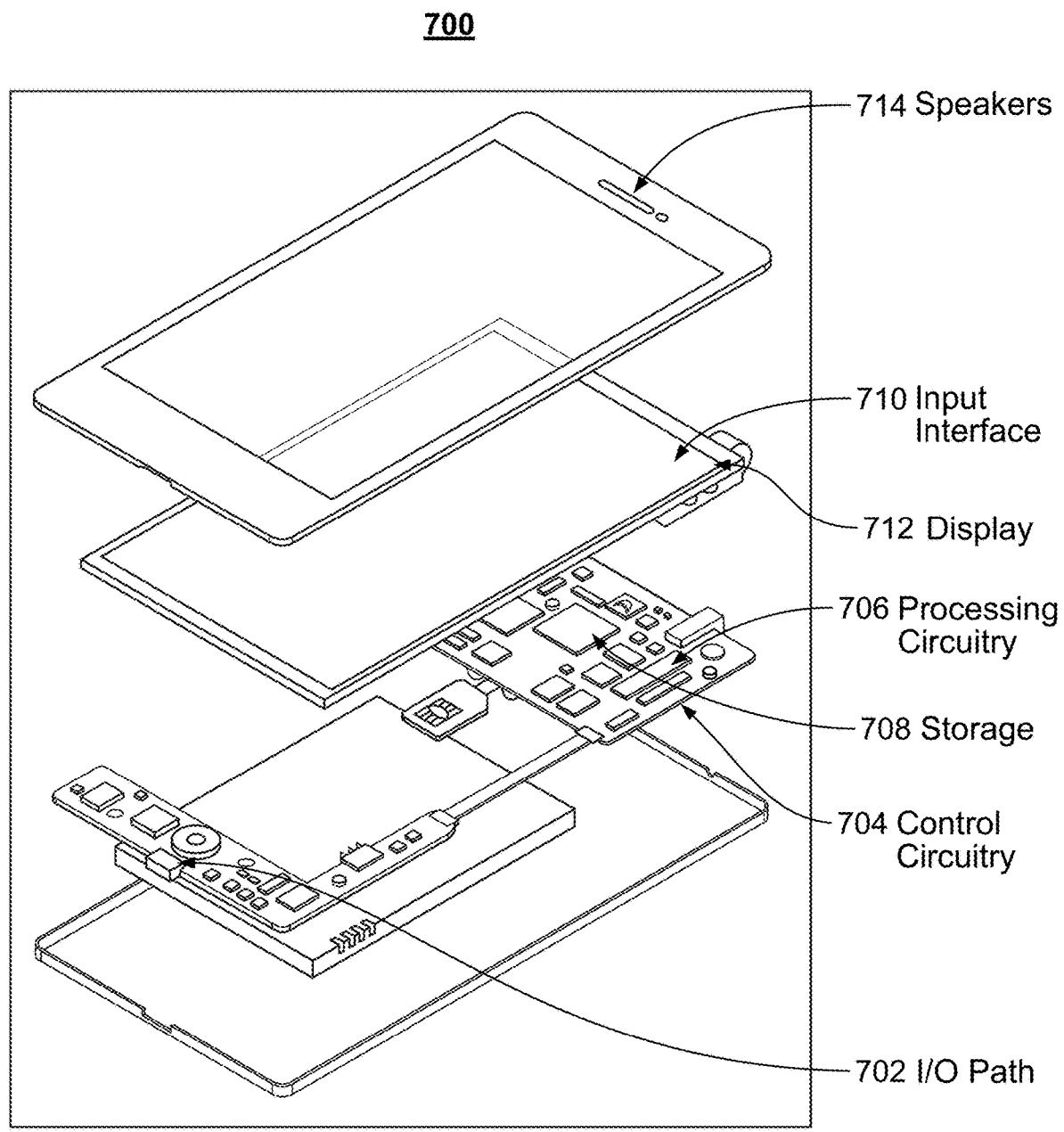
FIG. 7 is a diagram of an illustrative device, in accordance with some embodiments of the disclosure.
Figure 8:
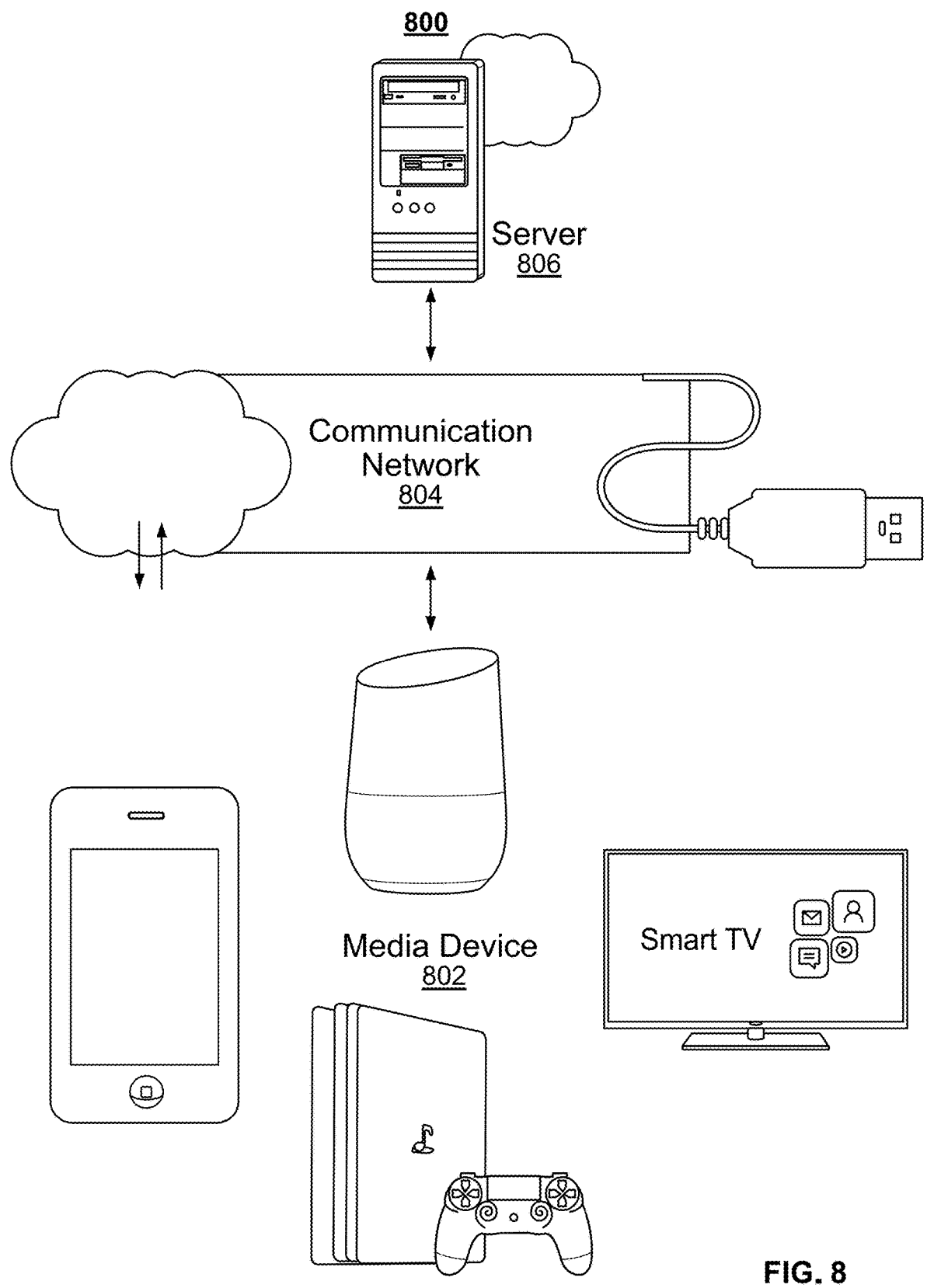
FIG. 8 is a diagram of an illustrative system, in accordance with some embodiments of the disclosure.

An exemplary embodiment is depicted in FIG. 1 as a messaging application running on smartphone 100 with distinct conversations featured in each of user interface 101 and user interface 151. Other devices such as a personal computer, laptop, tablet, media center, video console, and any device as depicted in FIGS. 7 and 8 are suitable substitutes for smartphone 100, as long as the device has the capabilities of receiving input and sending and receiving messages via a message service over a network.

A display screen of smartphone 100 with the messaging application is depicted as user interface 101. User interface 101 features messages sent and received via the messaging service. On user interface 101 appears banner 102, which indicates the recipient of the messages and/or the person in a conversation as recipient name 103. In this depicted embodiment, banner 102 that the message exchange is with John W., as identified by recipient name 103. User interface 101 also features back arrow 104, which triggers the messaging app to leave this message exchange and, e.g., view a list of other message recipients.

User interface 101 features a message area 105 where messages 108, 110, 116, and 118 are depicted. Message area 105 also includes corresponding times 106, 112, 114, and 120. User interface 101 also features and input mechanism for sending a message in message input box 130. A user can input a message via typing on the displayed exemplary on-screen keyboard 126, using words that may appear in keyboard banner 124 (e.g., via auto-complete or predictive text) or via other applications accessible through icons 122. After a user has input a message in message input box 130, the user would select or press send button 132.

Messages 108, 110, 116, and 118 depicted in message area 105 represent an exchange between the user and John W., as identified by recipient name 103. The user sent message 108, saying, "Are you coming over to watch the game tonight?" at time 106, 6:35 PM. John W., recipient 103, replied in message 110, "No. I have work to do." at time 112, 6:47 PM. The user sent Message 116 "Ok. NP" ("NP" indicating "no problem") at time 114, 6:48 PM. Then, at time 120, 7:02 PM, recipient 103, John W., asked, "How was your vacation?" in message 118.

FIG. 1 further depicts a display screen of smartphone 100 with the messaging application depicted as user interface 151. User interface 151 features messages sent and received via the messaging service. On user interface 151 appears banner 152, which indicates the recipient of the messages as recipient name 153. In this depicted embodiment banner 152 indicates that the message exchange is with "Eva Green Landscaping Service," as identified by recipient name 153. User interface 151 also features back arrow 104, which triggers the messaging app to leave this message exchange and, e.g., view a list of other message recipients.

User interface 151 features a message area 155 where messages 158, 160, and 166 are depicted. Message area 155 also includes corresponding times 156, 162, and 164.

Messages 158, 160, and 166 depicted in message area 155 represent an exchange between the user and "Eva Green Landscaping Service," as identified by recipient name 153. The Landscaping Service sent message 158, saying, "Hello, are you available on Tuesday for irrigation testing?" at time 156, 6:44 PM. The user replied in message 160, "Yes. When?" at time 162, 6:48 PM. The Landscaping Service sent message 166 "Will 11:30 AM work?" at time 164, 6:49 PM.

User interface 151 also features an input mechanism for sending a message in message input box 180. A user can input a message via typing on the exemplary on-screen keyboard 126, using words that may appear in keyboard banner 124, such as auto-complete or predictive text functions, or via other applications. Message input box 180 is larger than message input box 130 due to the text that has been input. Message input box 180 contains text, and the user has selected or pressed send button 182, intending to send the message.

The text contained in message input box 180 is "Great! Lisa and I enjoyed the trip a lot. I proposed and she said yes!" The text in message box 180 is clearly not directed towards answering the question "Will 11:30 AM work?" of message 166 at time 164, 6:49 PM. The text in message box 180 is better directed towards answering the question posed in message 118, "How was your vacation?" at time 120, 7:02 PM. As a result of pressing send button 182 to send the contents of message input box 180, warning box 170 appears over the message area 155. Warning box 170 includes warning message 172 saying, "Did you mean to send that message? Is this the correct conversation?" with a "Yes" action box 174 and "No" action box 176. The message is prevented from being sent until the user chooses between the "Yes" action box 174 and the "No" action box 176. Selecting or pressing the "Yes" action box 174 would, e.g., send the message, and selecting or pressing the "No" action box 176 would not send the message and allow deleting or editing the response.

Additionally, warning box 170 is more beneficial if not easily bypassed. In FIG. 1, the exemplary "No" action box 176 is depicted as larger and on the same side of user interface 151 as send button 182 to, e.g., facilitate pressing "No" action box 176 with the same finger that pressed send button 182, with the goal to prevent quick presses of the "Yes" action box 174 without reading warning box 170 including warning message 172.

Figure 2:
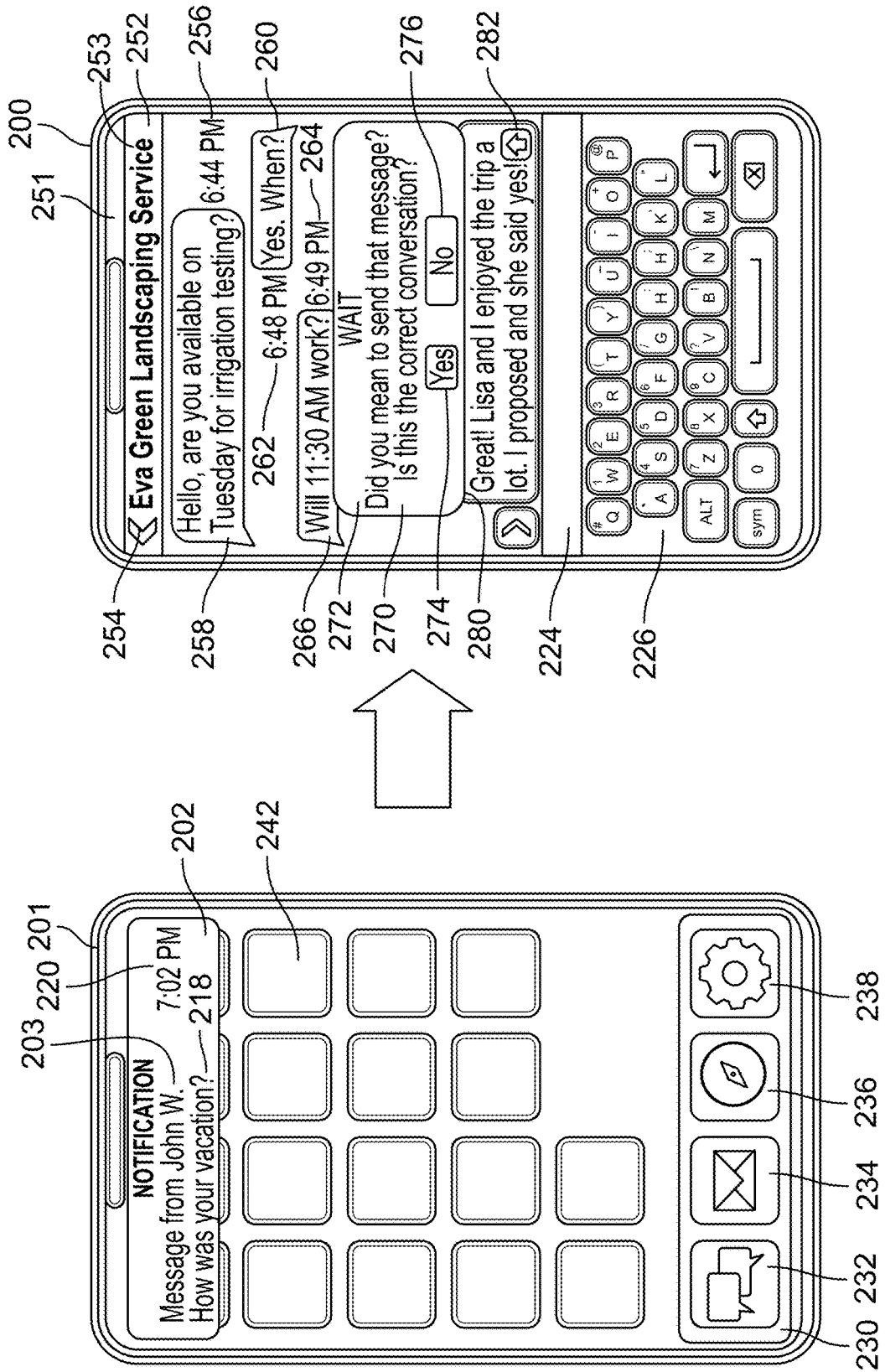
FIG. 2 depicts an illustrative scenario and user interface for preventing a message from being sent to an unintended recipient, in accordance with some embodiments of the disclosure.

FIG. 2 depicts an illustrative scenario and user interface for preventing a message from being sent to an unintended recipient, in accordance with some embodiments of the disclosure.

An exemplary embodiment is depicted in FIG. 2 as a messaging application running on smartphone 200 with distinct conversations depicted in each of user interface 201 and user interface 251. Other devices such as a personal computer, laptop, tablet, media center, video console, and any device as depicted in FIGS. 7 and 8 are suitable substitutes for smartphone 200. A display screen of smartphone 200 is depicted as the operating system user interface 201. User interface 201 features icons for applications such as application 242, as well as messaging app icon 232, mail app icon 234, browser app icon 236, and settings app icon 238 depicted in dock 230 of user interface 201.

On user interface 201 appears notification banner 202, which indicates the recipient of the messages and/or the person in a conversation as recipient name 203. In this depicted embodiment, notification banner 202 indicates that a message from John W., as identified by recipient name 203, was received. As indicated in notification banner 202 by recipient name 203, John W. asked, "How was your vacation?" in message 218 at time 220, 7:02 PM. In order to reply to this message a user might select the notification banner 202 or press the messaging app icon 232. If notification banner 202 disappears after a few seconds, the only option to reply may be to press the messaging app icon 232.

The user pressing the messaging app icon 232 may trigger a display like user interface 101 of FIG. 1 or user interface 251 of FIG. 2. If pressing the messaging app icon 232 to reply to the message opens to user interface 251 of FIG. 2, then the user runs a risk of inputting a reply in the wrong conversation and potentially sending a message intended for "John W.," to "Eva Green Landscaping Service."

FIG. 2 further depicts a display screen of smartphone 200 with the messaging application depicted as user interface 251. User interface 251 depicts messages sent and received via the messaging service. On user interface 251 appears banner 252, which indicates the recipient of the messages as recipient name 253. In this depicted embodiment, banner 252 indicates that the message exchange is with "Eva Green Landscaping Service," as identified by recipient name 253. User interface 251 also features back arrow 254 which triggers the messaging app to leave this message exchange and, e.g., view a list of other message recipients.

User interface 251 features a message area 255 where messages 258, 260, and 266 are depicted. Message area 255 also includes corresponding times 256, 262, and 264.

Messages 258, 260, and 266 depicted in message area 205 represent an exchange between the user and "Eva Green Landscaping Service" identified by recipient name 253. The Landscaping Service sent message 258, saying, "Hello, are you available on Tuesday for irrigation testing?" at time 256, 6:44 PM. The user replied in message 260, "Yes. When?" at time 262, 6:48 PM. The Landscaping Service sent message 266 "Will 11:30 AM work?" at time 264, 6:49 PM.

User interface 251 also features an input mechanism for sending a message in message input box 280. A user can input a message via typing on the exemplary on-screen keyboard 226, using words that may appear in keyboard banner 224, such as auto-complete or predictive text functions, or via other applications. Message input box 280 is larger than message input box 230 due to the text that has been input. Message input box 280 contains text, and the user has selected or pressed send button 282, intending to send the message.

The text contained in message input box 280 is "Great! Lisa and I enjoyed the trip a lot. I proposed and she said yes!" The text in message box 280 is clearly not directed towards answering the question "Will 11:30 AM work?" of message 266 at time 264, 6:49 PM. The text in message box 280 is, e.g., better directed towards answering the question posed in message 118 of FIG. 1, "How was your vacation?" at time 120, 7:02 PM. As a result of pressing send button 282 to send the contents of message input box 280, warning box 270 appears over the message area 255. Warning box 270 includes warning message 272 saying, "Did you mean to send that message? Is this the correct conversation?" with a "Yes" action box 274 and "No" action box 276. The message is prevented from being sent until the user chooses between the "Yes" action box 274 and the "No" action box 276. Selecting or pressing the "Yes" action box 274 would, e.g., send the message, and selecting or pressing the "No" action box 276 would not.

FIG. 3 depicts illustrative tables for conversation data structures and message data structures, in accordance with some embodiments of the disclosure. FIG. 3A depicts an illustrative table for a conversation data structure and message data structure, in accordance with some embodiments of the disclosure.

A conversation may be a message exchange between two or more recipients. A conversation may also be a message exchange discussing a single conversation topic or multiple conversation topics, where topics change quickly. A conversation could be a single message, for instance, in the case of a user or recipient changing topics and/or initiating a new conversation. A user of a messaging application may be involved in multiple conversations with multiple recipients, but also may be involved in multiple conversations with a single recipient. An embodiment of the present invention facilitates tracking conversations and storing conversation data to prevent a message from being sent in the wrong conversation.

An embodiment that may be used to track conversations and store conversation data incorporates a conversation data structure and message data structure as depicted in FIG. 3. A messaging service or messaging application may generate a conversation data structure to capture message data and time data within a conversation. There are many data structures suitable for tracking and storing conversations such as an array, matrix, stack, linked list, tree, queue or string. Hierarchical data structures such as a tree may be beneficial for organization of priorities and/or topics and keywords. Data structures may be stored in several ways, including in one or more databases. Data structures can be stored both locally on the device and remotely in a network. A messaging service application or system may utilize a context engine, stored and executed by one or more of the processors and memory depicted in FIGS. 7 and 8, to store and track conversation data in the effort to prevent sending a message to an unintended recipient.

One embodiment may include a context engine storing a conversation in a conversation data structure such as conversation data structure 310 depicted in FIG. 3A. Conversation data structure 310 includes fields such as date/time field 312, message field 314, from field 316, keywords field 318, and topic field 320. Conversation data structure 310 includes one or more incoming and/or outgoing messages or entries such as entry 322, entry 324, entry 326, and entry 328. Each entry, e.g., entry 322, may include data in each of the respective data fields such as date/time field 312, message field 314, from field 316, keywords field 318, and topic field 320. To generate the data structure such as conversation data structure 310, the context engine would parse a sent or received message for data for each field. The messaging service or application would analyze each message in a conversation and record the date and time of the message in the date/time field 312, record message data to the message field 314, and record sender data to the from field 316. Sender data may be a name, telephone number, username, email address or other unique identifier.

From the message data recorded in message field 314, a context engine generates keywords for recording in keywords field 318. Keywords generally can be words or concepts of significance to a conversation or, more generally, can be nouns and verbs, and potentially descriptive words (e.g., adjectives and adverbs) found in a respective message. Some messages may not include any seemingly significant words, for instance, messages with brief replies of "yes," "no," or "ok," which may be recorded as keywords. Keywords may also include words identifying pessimism (or optimism) with another keyword such as "not" or "don't" so as to preserve context of the keyword(s). The context engine may have to analyze prior messages when a later message uses a pronoun to identify one or more keywords. Keywords may further include synonyms and related words of keywords found in a message. It is preferable that the context engine is connected to a network, such as the internet, so that the context engine may be able to identify synonyms and related words from a keyword-topic database, and potentially from an external dictionary such as Dictionary.com, Thesaurus.com, Wiktionary, Merriam-Webster, Urban Dictionary or other sources to search and retrieve the meanings of localized, slang, translated, and/or abbreviated words. An embodiment may include the context engine identifying keywords based on machine learning.

In order to generate data for the topic field 320 of a particular message, the context engine must identify one or more related topics based on the one or more keywords. The context engine may acquire one or more related topics via a search in the keyword-topic database. The keyword-topic database may include a hierarchical database that groups, classifies or categorizes keywords with topics. Certain keywords may also be topics. The context engine may identify multiple potential topics based on one or more keywords and may be able to confirm or eliminate potential topics based on other keywords. For instance, a keyword like "strike" may indicate topics such as "baseball," "bowling," or "organized labor," but if a keyword like "ball" was also recorded, then organized labor can likely be eliminated. An embodiment may include the context engine identifying topics based on machine learning.

For a message, e.g., an outgoing message, to be checked against multiple conversations to ensure the message is not sent to an unintended recipient, the context engine would generate a message data structure in a manner similar to the generation of the conversation data structure. Message data structure 330 includes fields such as date/time field 332, message field 334, to field 336, and keywords field 338. To generate a data structure such as message data structure 330, the context engine would parse a message for data for each field. The messaging service or application would analyze each message in a conversation and record the date and time of the message in the date/time field 332, record message data to the message field 334, and record receiver data in the to field 336. Receiver data may be a name, telephone number, username, email address or other unique identifier. From the message data recorded in message field 334, a context engine generates keywords for recording in keywords field 338.

With data stored in a conversation data structure and a message data structure, the context engine is able to correlate a message data structure with one or more conversation data structures to determine how relevant the message is to the conversation. The context engine may generate a relevance score based upon the correlation of a message data structure with a conversation data structure that indicates a level of relevance. The higher a relevance score for a particular message and a conversation data structure, the better the fit the message would be in the corresponding conversation. The relevance score may be, for instance, a number from 0 to 10, a decimal from 0 to 1, a rating of high, medium, or low, and/or a collection of scores corresponding to multiple topics or categories. The context engine produces a relevance score for a message and a conversation data structure based on the correlation of the message and the conversation data structure.

Correlating a message data structure and a conversation data structure can be performed in many ways. For instance, an embodiment may correlate a message data structure and a conversation data structure by comparing keywords stored in keywords field 318 of, e.g., entry 322, entry 324, entry 326, and entry 328 in conversation data structure 310 with keywords stored in keywords field 338 of message data structure 330, counting keywords that match, and normalizing the count to generate a relevance score. An embodiment may correlate a message data structure and a conversation data structure by comparing keywords stored in keywords field 338 of message data structure 330 with keywords identified in the keyword-topic database as associated with topic data stored in topic field 320 of, e.g., entry 322, entry 324, entry 326, and entry 328, counting keywords that match, and normalizing the count to generate a relevance score. An embodiment may correlate by a combination of comparisons between data stored in the keyword field 338 of a message data structure 330 and data stored in the keyword field 318 of entries in conversation data structure 310 and comparisons between data stored in the keyword field 338 of a message data structure 330 and keywords identified in the keyword-topic database as associated with the data stored in the topic field 320 of entries in conversation data structure 310.

An embodiment may include the context engine correlating a message data structure and a conversation data structure by way of incorporating data from the date/time field 312 and data from the date/time field 332. For instance, a comparison of data from the date/time field 332 for message data structure 330 to data from the date/time field 312 from conversation data structure 310 may identify similar times or a smaller time gap, which may indicate a higher likelihood that the message is relevant to the corresponding conversation. It may be beneficial to weight correlation data or weight a relevance score based on the time gap between the message and the latest entry in the conversation data structure, because it is common for users to send messages to unintended recipients in older conversations and conversations where they had previously replied and the conversation was left open. A weighting inversely proportional to the time gap would help ensure timely replies had higher correlation values. In an embodiment, correlating a message data structure and a conversation data structure may simply be identifying the time gap between the message and the latest entry in the conversation data structure to calculate a relevance score based on how quick the response would be.

FIG. 3B depicts an illustrative table for a conversation data structure and message data structure, in accordance with some embodiments of the disclosure. The conversation data structure 350 and message data structure 370 of FIG. 3B include a type field 361 and type field 379 in addition to the elements comprised in conversation data structure 310 and message data structure 330 of FIG. 3A. Type field 361 may store data describing the type or structure of the message; for instance, type field 361 may identify if the corresponding message is a question, response, thought, or declaration. Likewise, type field 379 may store data describing the type or structure of the message. The context engine identifying a type of message may, for instance, require accessing structure data and comparing the message to sentences of known message types. An embodiment may include the context engine identifying a type of message based on the punctuation used or the placement of recognized parts of a sentence such as a subject and a predicate. An embodiment may include the context engine identifying a type of message based on machine learning.

Correlating a message data structure 370 and a conversation data structure 350 can also be performed in many ways and may include comparing type field 361 and type field 379 and identifying, e.g., corresponding questions, answers, remarks, and suggestions.

Figure 4:
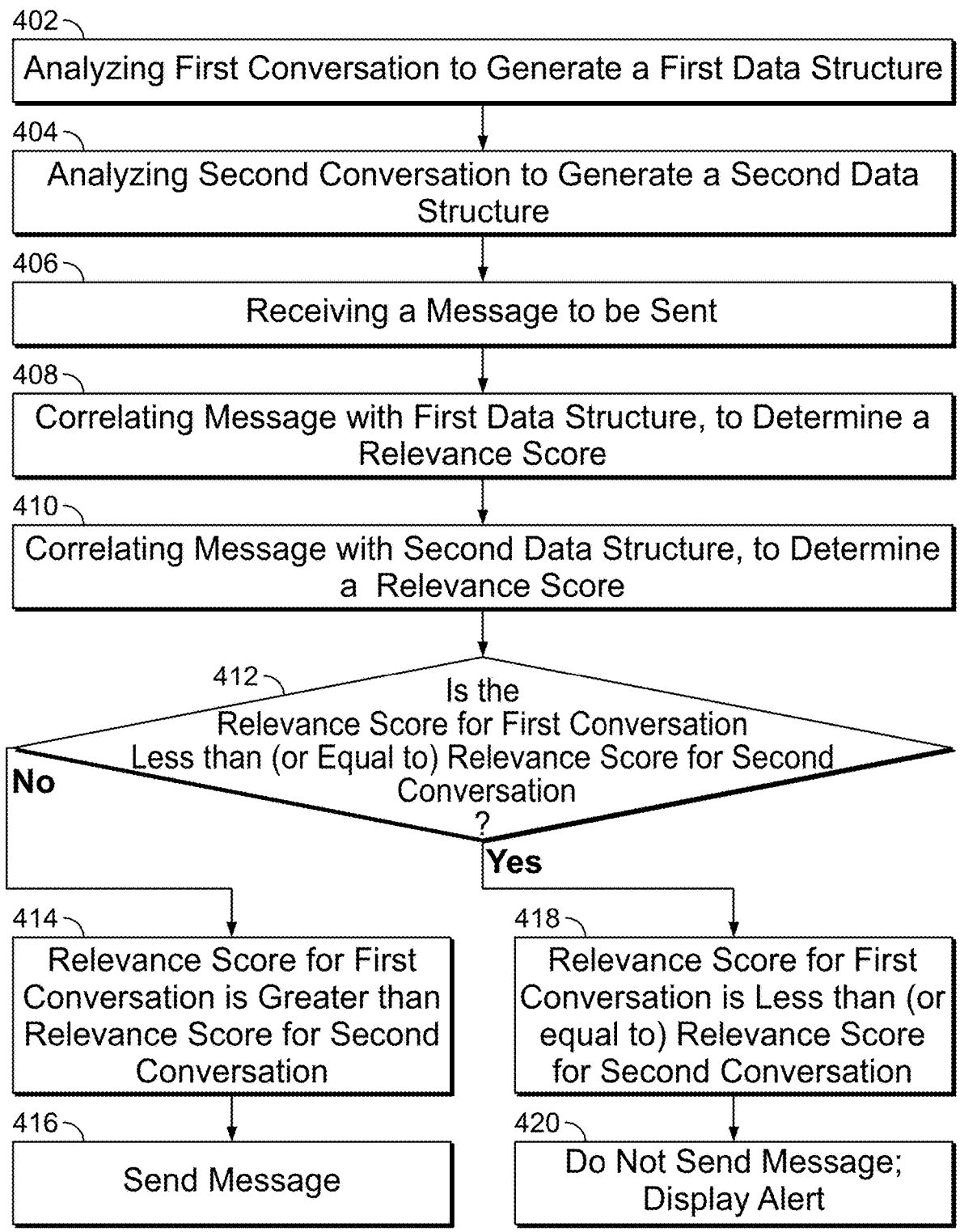
FIG. 4 depicts an illustrative flowchart of a process for preventing a message from being sent to an unintended recipient from one of at least two conversations, in accordance with some embodiments of the disclosure.

FIG. 4 depicts an illustrative flowchart of a process for preventing a message from being sent to an unintended recipient from one of at least two conversations. An embodiment may include, for instance, a context engine carrying out the steps depicted in the flowchart of FIG. 4.

In step 402, the context engine analyzes the first conversation to generate a first conversation data structure. In step 404 the context engine analyzes a second conversation to generate a second conversation data structure. In step 406, the context engine receives a message intended to be sent to the recipient from the first conversation. In step 408, the context engine correlates the message with the first conversation data structure to determine a first relevance score. Then in step 410, the context engine correlates the message with the second conversation data structure to determine a second relevance score. In step 412, the context engine compares the relevance score for the first conversation and the relevance score for the second conversation. If the first relevance score is greater than the second relevance score it may indicate a likelihood that the message is a better fit with the first conversation than the second conversation and the message should be sent. If the first relevance score is less than or equal to the second relevance score it may indicate a likelihood that the message is a better fit with the second conversation than the first conversation and the message should not be sent.

In step 414, the relevance score for the first conversation is determined to be greater than the relevance score for the second conversation and, in step 416, the message is sent. In step 418, the relevant score for the first conversation is determined to be less than or equal to the relevant score for the second conversation and, in step 420, the message is prevented from being sent and an alert is displayed.

Figure 5:
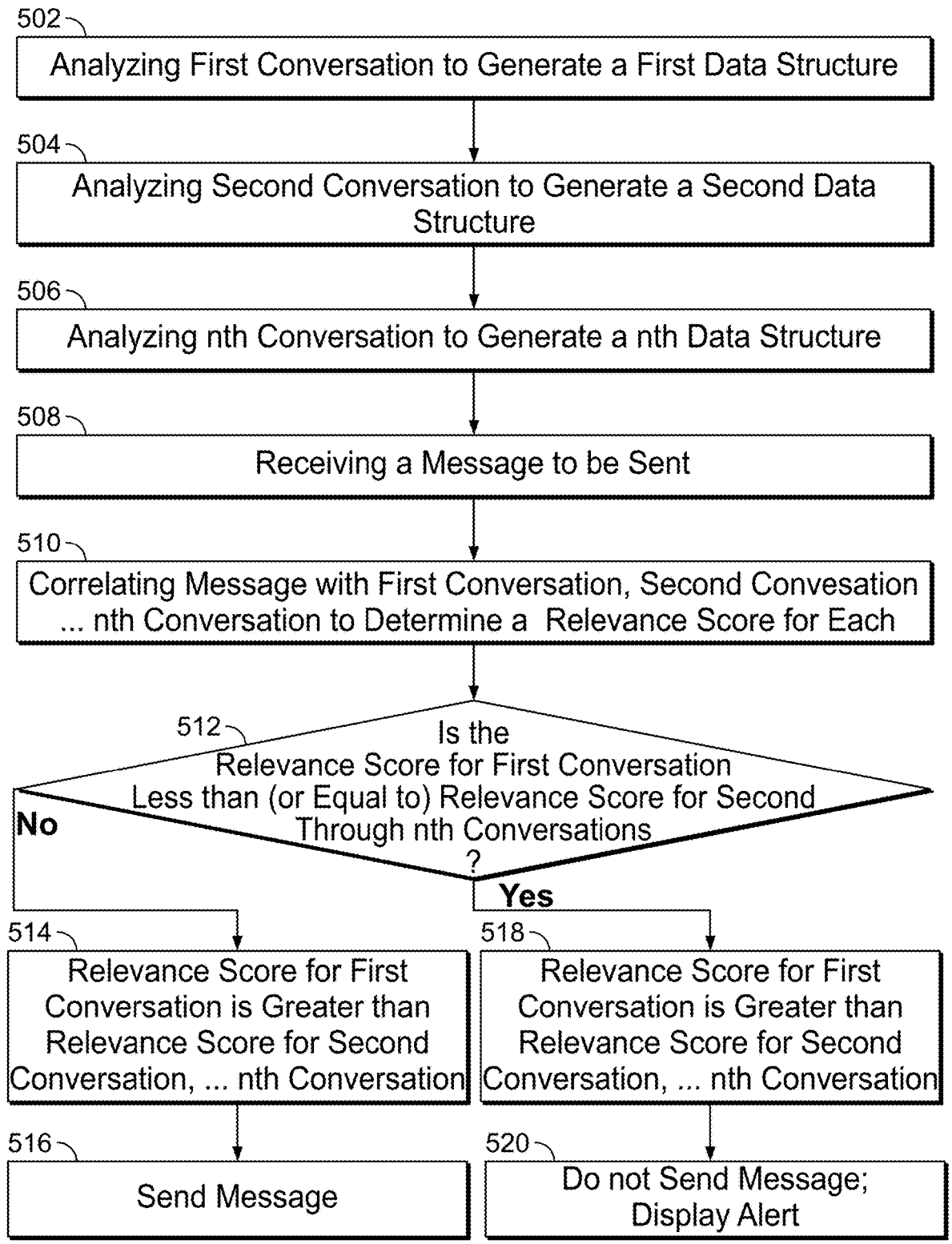
FIG. 5 depicts an illustrative flowchart of a process for preventing a message from being sent to an unintended recipient from one of multiple conversations, in accordance with some embodiments of the disclosure.

FIG. 5 depicts an illustrative flowchart of a process for preventing a message from being sent to an unintended recipient from one of multiple conversations. An embodiment may include, for instance, a context engine carrying out the steps depicted in the flowchart of FIG. 5.

In step 502, the context engine analyzes the first conversation to generate a first conversation data structure. In step 504, the context engine analyzes a second conversation to generate a second conversation data structure. In step 506, the context engine analyzes an nth conversation to generate an nth conversation data structure. In step 508, the context engine receives a message intended to be sent to the recipient from the first conversation. In step 510, the context engine correlates the message with the first conversation data structure to determine a first relevance score, the context engine correlates the message with the second conversation data structure to determine a second relevance score, and the context engine correlates the message with the nth conversation data structure to determine an nth relevance score. In step 512, the context engine compares the relevance score for the first conversation to each of the relevance score for the second conversation and the relevance score for the nth conversation. If the first relevance score is greater than each of the second through nth relevance scores, it may indicate a likelihood that the message is a better fit with the first conversation than any of the other conversations and the message should be sent. If the first relevance score is less than (or equal to) each of the second through nth relevance scores, it may indicate a likelihood that the message is a better fit with one of the second through nth conversations than the first conversation and the message should not be sent.

In step 514, the relevance score for the first conversation is determined to be greater than the relevance score for the second through nth conversation and, in step 518, the message is sent. In step 418, the relevant score for the first conversation is determined to be less than (or equal) to the relevant score for the second conversation and, in step 420, the message is prevented from being sent and an alert is displayed.

Figure 6:
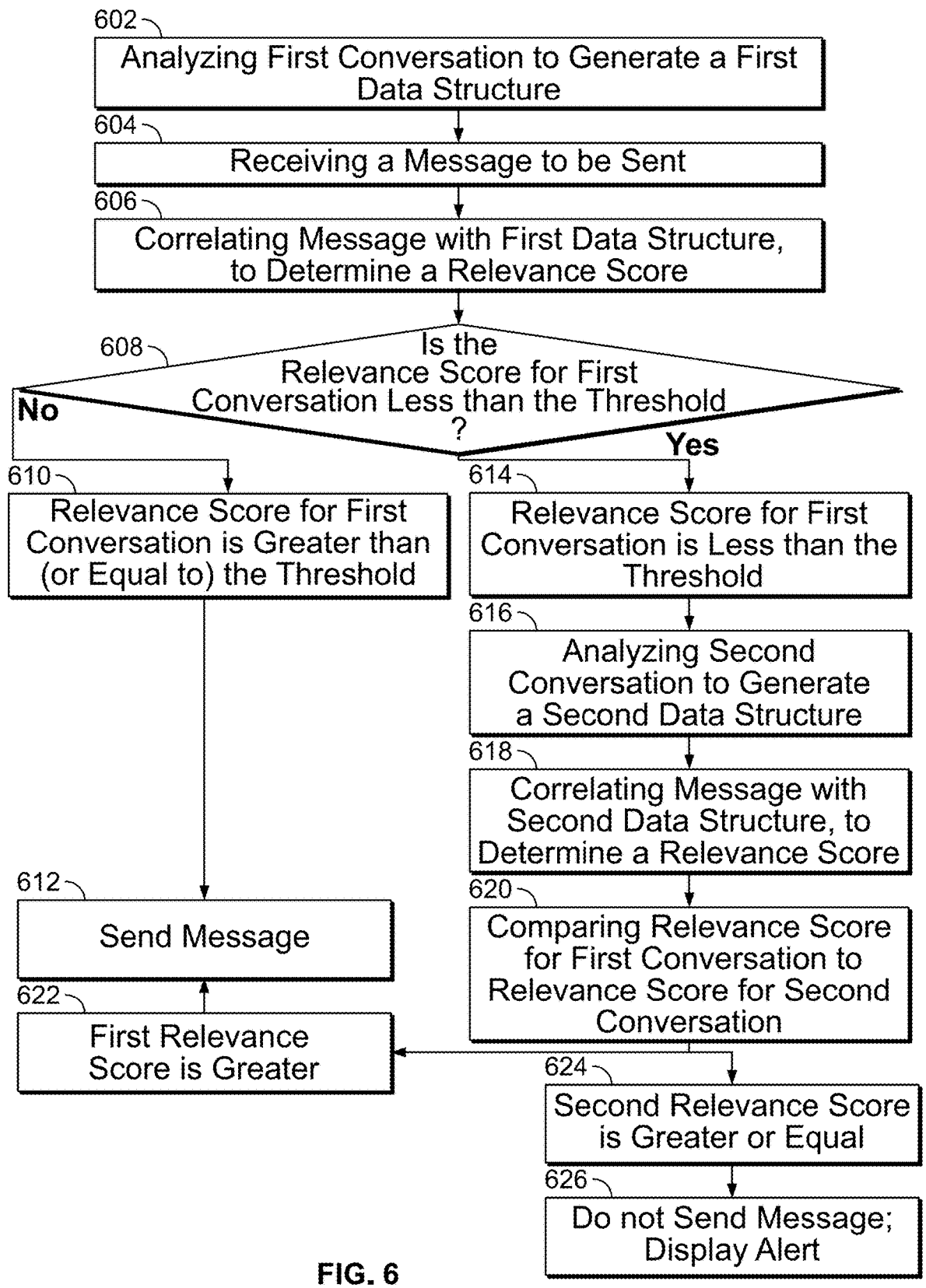
FIG. 6 depicts an illustrative flowchart of a process for preventing a message from being sent to an unintended recipient unless it is determined that a new conversation was initiated, in accordance with some embodiments of the disclosure.

FIG. 6 depicts an illustrative flowchart of a process for preventing a message from being sent to an unintended recipient unless it is determined that a new conversation was initiated. For instance, the relevance of the message may be compared to a predetermined threshold before relevance to another conversation is analyzed, and if the message is not relevant to either conversation, the message may create a new conversation. An embodiment may include, for instance, a context engine carrying out the steps depicted in the flowchart of FIG. 6.

In step 602, the context engine analyzes the first conversation to generate a first conversation data structure. In step 604, the context engine receives a message intended to be sent to the recipient from the first conversation. In step 606 the context engine correlates the message with the first conversation data structure to determine a first relevance score. In step 608, the context engine compares the first relevance score to a predetermined threshold. If, in step 610, the relevance score is greater than or equal to the predetermined threshold then the message is sent in the first conversation in step 612. If, in step 614, the relevance score for the first conversation is less than the predetermined threshold then the context engine must analyze a second conversation to generate a second conversation data structure. Then, in step 618, the context engine correlates the message with the second conversation data structure to determine a second relevance score. In step 620, the context engine compares the relevance score for the first conversation with the relevance score for the second conversation. If the first relevance score is greater than the second relevance score it may indicate a likelihood that the message is a better fit with the first conversation than the second conversation and the message should be sent, even if the first relevance did not meet the predetermined threshold. If the first relevance score is less than or equal to the second relevance score it may indicate a likelihood that the message is a better fit with the second conversation than the first conversation and the message should not be sent.

In step 622, the relevance score for the first conversation is determined to be greater than the relevance score for the second conversation and, in step 612, the message is sent and a new conversation is initiated. In step 624, the relevant score for the first conversation is determined to be less than the relevant score for the second conversation and, in step 626, the message is prevented from being sent and an alert is displayed.

FIG. 7 shows a generalized embodiment of illustrative device 700. As referred to herein, device 700 should be understood to mean any device that can receive input and send and receive messages via a message service over a network. As depicted in FIG. 7, device 700 is a smartphone. However, device 700 is not limited to smartphones and may be any computing device. For example, device 700 of FIG. 7 can be implemented in system 800 of FIG. 8 as device 802 (e.g., a smartphone, a smart television, a tablet, a smart speaker, a computer, or any combination thereof).

Media device 700 may receive data via input/output (hereinafter I/O) path 702. I/O path 702 may provide received data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communication paths (described below). I/O functions may be provided by one or more of these communication paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a context engine stored in memory (i.e., storage 708).

A context engine may be a stand-alone application implemented on a device or a server. The context engine may be implemented as software or a set of executable instructions. The instructions for performing any of the embodiments discussed herein of the context engine may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 7 the instructions may be stored in storage 708, and executed by control circuitry 704 of a device 700.

In some embodiments, a context engine may be a client-server application where only the client application resides on device 700 (e.g., device 802), and a server application resides on an external server (e.g., server 806). For example, a context engine may be implemented partially as a client application on control circuitry 704 of device 700 and partially on server 806 as a server application running on control circuitry. Server 806 may be a part of a local area network with device 802, or may be part of a cloud computing environment accessed via the internet. In a cloud computing environment, various types of computing services for performing searches on the internet or informational databases, providing storage (e.g., for the keyword-topic database) or parsing data are provided by a collection of network-accessible computing and storage resources (e.g., server 806), referred to as "the cloud." Media device 700 may be a cloud client that relies on the cloud computing capabilities from server 806 to generate the relevant data structures, correlate the data structures, and determine a relevance score by the context engine. When executed by control circuitry of server 806, the context engine may instruct the control circuitry to generate the context engine output (e.g., the relevance scores) and transmit the generated output to device 802. The client application may instruct control circuitry of the receiving device 802 to generate the context engine output. Alternatively, device 802 may perform all computations locally via control circuitry 704 without relying on server 806.

Control circuitry 704 may include communications circuitry suitable for communicating with a context engine server or other networks or servers. The instructions for carrying out the above-mentioned functionality may be stored and executed on server 806. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Non-volatile memory may also be used (e.g., to launch a boot-up routine and other instructions). Cloud-based storage (e.g., on server 806) may be used to supplement storage 708 or instead of storage 708.

A user may send instructions to control circuitry 704 using user input interface 710 of device 700. User input interface 710 may be any suitable user interface touch-screen, touchpad, stylus and may be responsive to external device add-ons such as a remote control, mouse, trackball, keypad, keyboard, joystick, voice recognition interface, or other user input interfaces. Display 710 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 712. Speakers 714 may be provided as integrated with other elements of user equipment device 700 or may be stand-alone units. An audio component of a message and other content displayed on display 712 may be played through speakers 714. In some embodiments, the audio may be distributed to a receiver (not shown), which processes and outputs the audio via speakers 714.

Control circuitry 704 may allow a user to provide user profile information or may automatically compile user profile information. For example, control circuitry 704 may monitor the words the user inputs in his/her messages for keywords and topics. In some embodiments, control circuitry 704 monitors user inputs such as texts, calls, conversation audio, social media posts, etc., to detect keywords and topics. Control circuitry 704 may store the detected input terms in a keyword-topic database and the keyword-topic database may be linked to the user profile. Additionally, control circuitry 704 may obtain all or part of other user profiles that are related to a particular user (e.g., via social media networks), and/or obtain information about the user from other sources that control circuitry 704 may access. As a result, a user can be provided with a unified experience across the user's different devices.

As depicted in FIG. 8, device 802 may be coupled to communication network 804. Communication network 804 may be one or more networks including the internet, a mobile phone network, mobile voice or data network (e.g., a 4G or LTE network), cable network, public switched telephone network, Bluetooth, or other types of communications network or combinations of communication networks. Thus, device 802 may communicate with server 806 over communication network 804 via communications circuitry described above. In should be noted that there may be more than one server 806, but only one is shown in FIG. 8 to avoid overcomplicating the drawing. The arrows connecting the respective device(s) and server(s) represent communication paths, which may include a satellite path, a fiber-optic path, a cable path, a path that supports internet communications (e.g., IPTV), free-space connections (e.g., for broadcast or other wireless signals), or any other suitable wired or wireless communications path or combination of such paths.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of determining whether a message should be prevented from being sent to an unintended recipient, the method comprising:
   accessing a first conversation with a first recipient, the first conversation comprising messages transmitted via a network to or from the first recipient and first conversation time data;
   generating a first context data structure based on content of the first conversation, the first context data structure comprising the first conversation time data;
   accessing a second conversation with a second recipient, the second conversation comprising messages transmitted via the network to or from the second recipient, and not transmitted to or from the first recipient, and second conversation time data;
   generating a second context data structure based on content of the second conversation, the second context data structure comprising the second conversation time data;
   receiving, via input to a user interface, a request to transmit a message via the network to the first recipient, wherein the second recipient is not identified in the request to transmit the message;
   determining a first relevance score for the first recipient based on correlating the message with the first context data structure and a first time gap based on the first conversation time data, wherein the first time gap is inversely proportional to the first relevance score;
   determining a second relevance score for the second recipient who is not identified in the request to transmit the message based on correlating the message with the second context data structure and a second time gap based on the second conversation time data, wherein the second time gap is inversely proportional to the second relevance score;
   determining whether the first relevance score exceeds the second relevance score;

in response to determining that the first relevance score exceeds the second relevance score, allowing transmission via the network of the message to the first recipient; and in response to determining that the first relevance score does not exceed the second relevance score, preventing transmission over the network of the message to the first recipient and providing an alert via the user interface indicating that the first conversation may not be correct.

2. The method of claim 1, wherein the correlating the message with the first context data structure includes correlating message time data with first conversation time data, and wherein the correlating the message with the second context data structure includes correlating message time data with second conversation time data.

3. The method of claim 1, wherein the correlating the message with the first context data structure includes weighting based on a comparison of the first conversation time data and the message time data.

4. The method of claim 1, wherein the correlating the message with the second context data structure includes weighting based on a comparison of the second conversation time data and the message time data.

5. The method of claim 1, wherein the first context data structure includes a hierarchal structure including one or more topics and a plurality of keywords from the first conversation.

6. The method of claim 1, wherein the first conversation, the second conversation, and the message are text-based.

7. The method of claim 1, wherein the comparing further comprises:
comparing each of the first relevance score and the second relevance score to a predetermined threshold;
creating a third conversation based on the message if the first relevance score and the second relevance do not meet or exceed the predetermined threshold; and
sending the message.

8. The method of claim 1, wherein the first context data structure and the second context data structure include at least one of an array, matrix, stack, linked list, tree, queue or string.

9. A system for preventing a message from being sent to an unintended recipient, the system comprising:
memory configured to store a first conversation with a first recipient and a second conversation with a second recipient, wherein, the first conversation comprising messages transmitted via a network to or from the first recipient and first conversation time data and the second conversation comprising messages transmitted via the network to or from the second recipient, and not transmitted to or from the first recipient, and second conversation time data;
input/output circuitry configured to receive, via input to a user interface, a request to transmit a message via the network to the first recipient, wherein the second recipient is not identified in the request to transmit the message;
processing circuitry configured to:
generate a first context data structure based on content of the first conversation, the first context data structure comprising the first conversation time data;
generate a second context data structure based on content of the second conversation, the second context data structure comprising the second conversation time data;
determine a first relevance score for the first recipient based on correlating the message with the first context data structure and a first time gap based on the first conversation time data, wherein the first time gap is inversely proportional to the first relevance score;
determine a second relevance score for the second recipient who is not identified in the request to transmit the message based on correlating the message with the second context data structure and a second time gap based on the second conversation time data, wherein the second time gap is inversely proportional to the second relevance score;
in response to determining that the first relevance score exceeds the second relevance score, allow transmission via the network of the message to the first recipient; and
in response to determining that the first relevance score does not exceed the second relevance score, prevent transmission over the network of the message to the first recipient and cause an alert to be provided via the user interface indicating that the first conversation may not be correct.

10. The system of claim 9, wherein the processing circuitry is configured to correlate message time data with first conversation time data and correlate the message time data with second conversation time data.

11. The system of claim 9, wherein the processing circuitry is configured to determine the first relevance score by weighting based on a comparison of the first conversation time data and the message time data.

12. The system of claim 9, wherein the processing circuitry is configured to determine the second relevance score by weighting based on a comparison of the second conversation time data and the message time data.

13. The system of claim 9, wherein the first context data structure includes a hierarchal structure including one or more topics and a plurality of keywords from the first conversation.

14. The system of claim 9, wherein the first conversation, the second conversation, and the message are text-based.

15. The system of claim 9, wherein the first context data structure and the second context data structure include at least one of an array, matrix, stack, linked list, tree, queue or string.

16. A method of determining whether a message should be prevented from being sent to an unintended recipient, the method comprising:
accessing a first conversation with a first recipient, the first conversation comprising messages transmitted via a network to or from the first recipient and first conversation time data;
generating a first context data structure based on content of the first conversation, the first context data structure comprising the first conversation time data;
accessing a second conversation with a second recipient, the second conversation comprising messages transmitted via the network to or from the second recipient and not transmitted to or from the first recipient, and second conversation time data;
generating a second context data structure based on content of the second conversation, the second context data structure comprising the second conversation time data;
receiving a request to transmit a message via the network to the first recipient, wherein the second recipient is not identified in the request to transmit the message;

determining a first relevance score for the first recipient based on comparing keywords or topics for the message and the first context data structure and a first time gap based on the first conversation time data, wherein the first time gap is inversely proportional to the first relevance score;

determining a second relevance score for the second recipient who is not identified in the request to transmit the message based on comparing the keywords or topics for the message and the second context data structure and a second time gap based on the second conversation time data, wherein the second time gap is inversely proportional to the second relevance score;

determining whether the first relevance score exceeds the second relevance score;

in response to determining that the first relevance score exceeds the second relevance score, allowing transmission via the network of the message in the first conversation; and in response to determining that the first relevance score does not exceed the second relevance score, preventing transmission over the network of the message in the first conversation and providing an alert via the user interface indicating that the first conversation may not be correct.

* * * * *